United States Patent
Yoshida et al.

(10) Patent No.: US 8,122,706 B2
(45) Date of Patent: Feb. 28, 2012

(54) EXHAUST PURIFICATION SYSTEM OF INTERNAL COMBUSTION ENGINE

(75) Inventors: Kohei Yoshida, Gotenba (JP); Shinya Hirota, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 567 days.

(21) Appl. No.: 12/227,852

(22) PCT Filed: Jun. 20, 2007

(86) PCT No.: PCT/JP2007/062828
§ 371 (c)(1),
(2), (4) Date: Dec. 1, 2008

(87) PCT Pub. No.: WO2007/148821
PCT Pub. Date: Dec. 27, 2007

(65) Prior Publication Data
US 2009/0183493 A1 Jul. 23, 2009

(30) Foreign Application Priority Data
Jun. 22, 2006 (JP) .................. 2006-172774

(51) Int. Cl.
*F01N 3/00* (2006.01)
(52) U.S. Cl. .............. 60/285; 60/273; 60/286; 60/289
(58) Field of Classification Search .............. 60/286, 60/289
See application file for complete search history.

(56) References Cited

U.S. PATENT DOCUMENTS

| | | | |
|---|---|---|---|
| 6,742,329 B2 * | 6/2004 | Miura et al. | 60/285 |
| 6,915,629 B2 * | 7/2005 | Szymkowicz | 60/289 |
| 6,938,411 B2 * | 9/2005 | Hoffmann et al. | 60/295 |
| 7,251,929 B2 * | 8/2007 | Hu et al. | 60/285 |
| 2001/0052232 A1 * | 12/2001 | Hoffmann et al. | 60/285 |
| 2002/0033017 A1 * | 3/2002 | Bruggemann et al. | 60/295 |
| 2003/0167756 A1 | 9/2003 | Szymkowicz | |
| 2004/0083724 A1 * | 5/2004 | Nakatani | 60/286 |
| 2004/0098979 A1 | 5/2004 | Hammerle et al. | |

FOREIGN PATENT DOCUMENTS

| | | |
|---|---|---|
| DE | 103 61 220 A1 | 7/2005 |
| EP | 1 321 643 A1 | 6/2003 |
| JP | A-6-117221 | 4/1994 |
| JP | A-7-243322 | 9/1995 |
| JP | A-10-252455 | 9/1998 |
| JP | A-11-200852 | 7/1999 |
| JP | A-2001-59414 | 3/2001 |
| JP | A-2001-90591 | 4/2001 |
| JP | A-2002-21544 | 1/2002 |
| JP | A-2003-314255 | 11/2003 |
| JP | A-2004-52611 | 2/2004 |
| JP | A-2004-60599 | 2/2004 |
| JP | A-2005-90256 | 4/2005 |
| JP | A-2005-133610 | 5/2005 |

OTHER PUBLICATIONS

Extended European Search Report issued in European Patent Application No. 07767634.4 dated Jul. 30, 2010.

* cited by examiner

*Primary Examiner* — Kenneth Bomberg
*Assistant Examiner* — Anthony Ayala Delgado
(74) *Attorney, Agent, or Firm* — Oliff & Berridge, PLC

(57) ABSTRACT

When performing temperature elevation control at a first exhaust purification device, a second exhaust purification device is prevented from being raised in temperature to a set temperature or more.

6 Claims, 2 Drawing Sheets

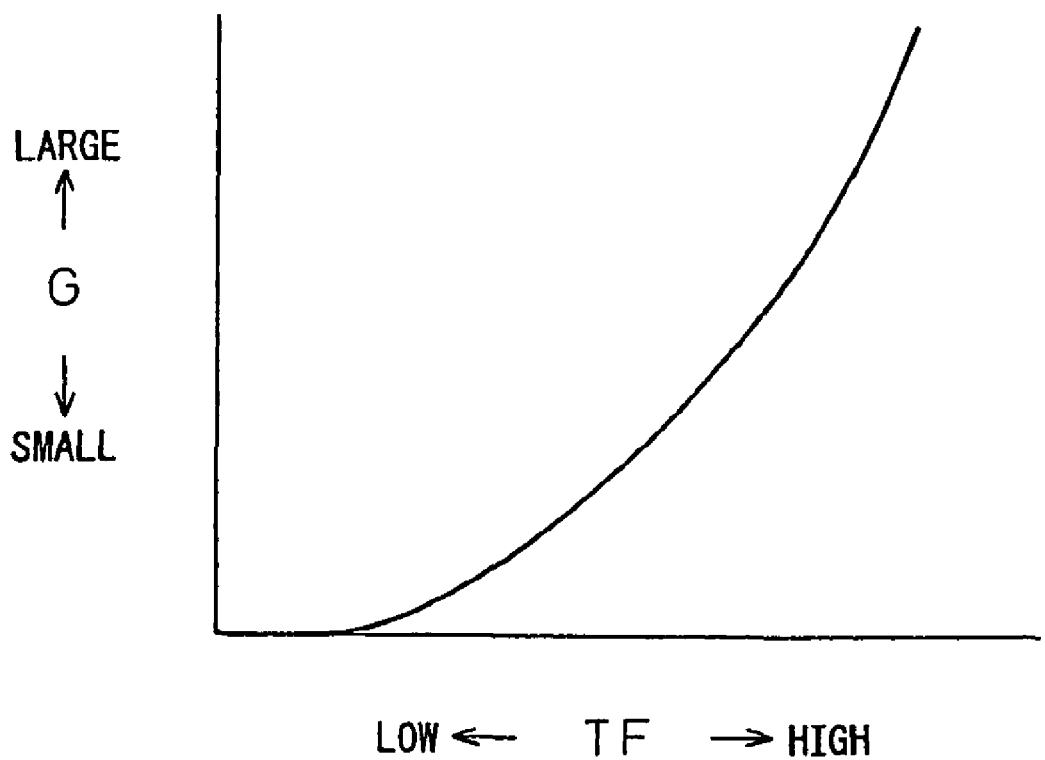

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine performing lean combustion such as a diesel engine. It has been proposed to arrange in series an NOx storing/reducing catalyst device for purifying the NOx in the exhaust passage of this internal combustion engine and a particulate filter for sufficiently purifying particulate at the downstream side of the NOx storing/reducing catalyst device (for example, refer to Japanese Unexamined Patent Publication No. 2005-90256, Japanese Unexamined Patent Publication No. 2005-133610, Japanese Unexamined Patent Publication No. 7-243322, Japanese Unexamined Patent Publication No. 11-200852, Japanese Unexamined Patent Publication No. 10-252455, and Japanese Unexamined Patent Publication No. 6-117221).

If making the particulate filter carry a NOx storage catalyst, NOx can be stored and purified by reduction. Additionally, the NOx storage catalyst can also function as an active oxygen release agent. The active oxygen released from the NOx storage catalyst can be used to purify the trapped particulate by oxidation at a low temperature. However, if a large amount of particulate is trapped at one time in the particulate filter such as during engine acceleration operation, there are times when just the active oxygen released from the NOx storage catalyst cannot sufficiently purify the trapped particulate by oxidation. Therefore, the amount of particulate deposition gradually increases. If a set amount or more of particulate deposits at the particulate filter, the exhaust resistance of the particulate filter will have a detrimental effect on the engine output, therefore, when the set amount of particulate deposits at the particulate filter, it becomes necessary to forcefully burn off the deposited particulate. To do so, the particulate filter must be raised in temperature to about 600 degrees C.

Such temperature elevation control of the particulate filter generally is performed by injecting additional fuel into the cylinder at the expansion stroke or exhaust stroke or feeding additional fuel to the engine exhaust system at the upstream side of the NOx storing/reducing catalyst device. This additional fuel of the temperature elevation control, when passing through the NOx storing/reducing catalyst device, is made to burn using oxygen in the exhaust gas by the oxidation catalyst carried at the NOx catalyst reduction catalyst device. The combustion heat raises the exhaust gas in temperature to 600 degrees C. or more. The exhaust gas is then made to flow into the particulate filter and makes the temperature of the particulate filter rise.

Therefore, for each temperature elevation control of the particulate filter, the NOx storing/reducing catalyst device is also simultaneously raised to 600 degrees C. or more, whereby the NOx storing/reducing catalyst device ends up deteriorating due to the heat.

DISCLOSURE OF THE INVENTION

Accordingly, an object of the present invention is to provide an exhaust purification system of an internal combustion engine comprising a first exhaust purification device such as a particulate filter which requires temperature elevation control to a set temperature (for example, 600 degrees C.) or more and a second exhaust purification device such as an NOx storing/reducing catalyst device which is arranged at the upstream side of the first exhaust purification device, which is prevented from deteriorating due to heat due to the temperature elevation control of the first exhaust purification device.

An exhaust purification system of an internal combustion engine comprises a first exhaust purification device requiring temperature elevation control to a set temperature or more and a second exhaust purification device arranged at an upstream side of the first exhaust purification device, characterized in that when the temperature elevation control is performed in the first exhaust purification device, the exhaust purification system prevents the second exhaust purification device from being raised in temperature to the set temperature or more.

An exhaust purification system of an internal combustion engine may provide the exhaust purification system of the internal combustion engine as set forth above characterized in that the exhaust purification system comprises a fuel feed system feeding fuel between the first exhaust purification device and the second exhaust purification device, makes the fuel fed by said fuel feed system burn by an oxidation catalyst carried on the first exhaust purification device or an oxidation catalyst carried on an oxidation catalyst device positioned at the immediately upstream side of the first exhaust purification device to perform the temperature elevation control in the first exhaust purification device, and prevents the second exhaust purification device from being raised in temperature to the set temperature or more when performing the temperature elevation control.

An exhaust purification system of an internal combustion engine may provide the exhaust purification system of the internal combustion engine as set forth above characterized in that when the temperature elevation control is performed in the first exhaust purification device, if the oxidation catalyst is less than the activation temperature, the exhaust purification system feeds a smaller amount of fuel from the upstream side of the second exhaust purification device than the amount of fuel fed by the fuel feed system, makes the smaller amount of fuel burn by an oxidation function of the second exhaust purification device to make the temperature of the exhaust gas rise, and makes the fuel feed system feed the fuel after the heated exhaust gas raises the oxidation catalyst in temperature to the activation temperature or more.

An exhaust purification system of an internal combustion engine may provide the exhaust purification system of the internal combustion engine as set forth above characterized in that the second exhaust purification device is a NOx storing/reducing catalyst device, when the air-fuel ratio of the exhaust gas flowing into the NOx storing/reducing catalyst device is made a stoichiometric air-fuel ratio or a rich air-fuel ratio to make the NOx storing/reducing catalyst device release and purify by reduction the stored NOx, the 20' exhaust purification system performs the temperature elevation control in the first exhaust purification device.

An exhaust purification system of an internal combustion engine may provide the exhaust purification system of the internal combustion engine as set forth above characterized in that the first exhaust purification device is a particulate filter carrying an active oxygen release agent and in that the exhaust purification system makes the fuel feed system feed fuel separately from the temperature elevation control so that the greater the amount of particulate flowing into the particulate filter per unit time is, the higher the temperature of the particulate filter becomes.

An exhaust purification system of an internal combustion engine may provide an exhaust purification system of the internal combustion engine as set forth above characterized in that the second exhaust purification device is a NOx storing/reducing catalyst device and in that a S trap storing SOx in the exhaust gas is arranged at the upstream side of the NOx storing/reducing catalyst device.

According to the exhaust purification system of the internal combustion engine as set forth above, the system comprises a first exhaust purification device requiring temperature elevation control to a set temperature or more and a second exhaust purification device arranged on an upstream side of the first exhaust purification device, and when the temperature elevation control is performed in the first exhaust purification device, the exhaust purification system prevents the second exhaust purification device from being raised in temperature to the set temperature or more. Due to this, the second exhaust purification device will not deteriorate due to heat due to the temperature elevation control of the first exhaust purification device.

According to the exhaust purification system of the internal combustion engine as set forth above, the exhaust purification system may comprise, a fuel feed system feeding fuel between the first exhaust purification device and the second exhaust purification device, and makes the fuel fed by the fuel feed system burn by an oxidation catalyst carried on the first exhaust purification device or an oxidation catalyst carried on an oxidation catalyst device positioned at the immediately upstream side of the first exhaust purification device. Thus, the combustion heat of the fuel generated at a downstream side of the second exhaust purification device is used to raise the temperature of the first exhaust purification device to the set temperature or more, so the second exhaust purification device is prevented from being raised in temperature to the set temperature or more due to the temperature elevation control of the first exhaust purification device.

According to the exhaust purification system of the internal combustion engine as set forth above, when the temperature elevation control is performed in the first exhaust purification device, if the oxidation catalyst is less than the activation temperature, the exhaust purification system feeds a smaller amount of fuel from the upstream side of the second exhaust purification device than the amount of fuel fed by the fuel feed system, makes the smaller amount of fuel burn by an oxidation function of the second exhaust purification device to make the temperature of the exhaust gas rise, and makes the fuel feed system feed the fuel after the heated exhaust raises the oxidation catalyst in temperature to the activation temperature or more. Therefore, the second exhaust purification device will not rise in temperature to the set temperature or more even if rising in temperature due to burning of the smaller amount of fuel, while the first exhaust purification device is raised in temperature well to the set temperature or more.

According to the exhaust purification system of the internal combustion engine as set forth above, the second exhaust purification device is an NOx storing/reducing catalyst device, when the air-fuel ratio of the exhaust gas flowing into said NOx storing/reducing catalyst device is made a stoichiometric air-fuel ratio or a rich air-fuel ratio to make the NOx storing/reducing catalyst device release and purify by reduction the stored NOx, the NOx storing/reducing catalyst device used as the second exhaust purification device burns the hydrocarbons in the exhaust gas using the oxygen in the exhaust gas and the reduction oxygen from the released NOx, so this combustion heat can be utilized for temperature elevation control of the first exhaust purification device. By performing the temperature elevation control in the first exhaust purification device at this time, it is possible to reduce the energy used for temperature elevation control.

According to the exhaust purification system of the internal combustion engine as set forth above, the first exhaust purification device is a particulate filter carrying an active oxygen release agent, and the exhaust purification system makes the fuel feed system feed the fuel between the particulate filter and the second exhaust purification device separately from the temperature elevation control so that the greater the amount of particulate flowing into the particulate filter per unit time is, the higher the temperature of the particulate filter becomes. Due to this, the greater the amount of particulate flowing into the particulate filter per unit time is, the higher the temperature of particulate filter becomes and the greater the amount of active oxygen released from the active oxygen release agent per unit time becomes, so the particulate trapped by the particulate filter is removed by oxidation well, deposition of the set amount of particulate becomes difficult, and the instances of temperature elevation control of the particulate filter can be reduced.

According to the exhaust purification system of the internal combustion engine as set forth above, the second exhaust purification device is a NOx storing/reducing catalyst device, and a S trap storing SOx in the exhaust gas is arranged at the upstream side of the NOx storing/reducing catalyst device. Therefore, the NOx storing/reducing catalyst device will not store SOx, temperature elevation control for making the NOx storing/reducing catalyst device release the stored SOx becomes unnecessary, and the heat deterioration accompanying this temperature elevation control will not occur.

BRIEF DESCRIPTION OF THE DRAWINGS

FIG. 3 is a graph showing a relationship of a temperature of a particulate filter and an amount of particulate removable by oxidation in a particulate filter carrying an active oxygen release agent.

BEST MODE FOR CARRYING OUT THE INVENTION

Figure 1:
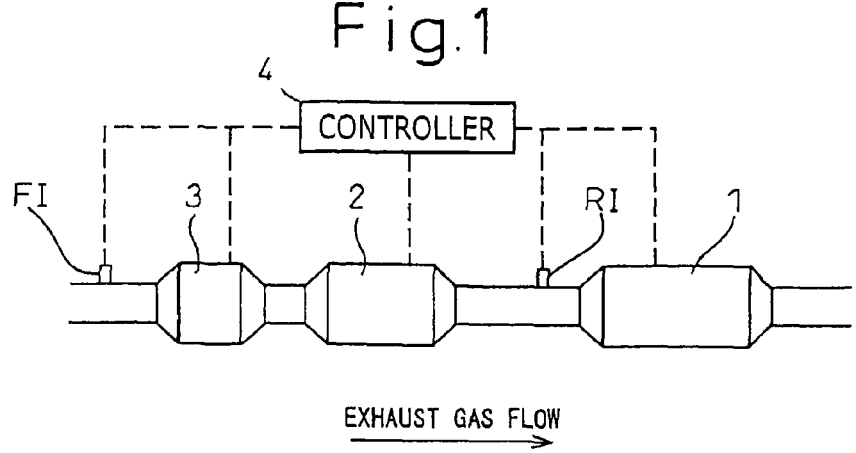
FIG. 1 is a schematic view of an engine exhaust system showing an exhaust purification system of an internal combustion engine of the present invention.

FIG. 1 is a schematic view of an engine exhaust system showing an exhaust purification system of an internal combustion engine according to the present invention. The internal combustion engine is one performing lean combustion such as a diesel engine. Its exhaust gas contains a comparatively large amount of NOx and particulate. Therefore, the engine exhaust system is provided with a particulate filter 1 for purifying particulate. At the upstream side of the particulate filter 1 is arranged in series a NOx storing/reducing catalyst device 2 for purifying the NOx.

This particulate filter 1 is for example a wall-flow type having a honeycomb structure formed from a porous material such as cordierite and has a large number of axial direction spaces divided by a large number of partition walls extending in the axial direction. Of two adjoining axial direction spaces, one is sealed at the exhaust downstream side by a cap, while the other is sealed at the exhaust upstream side by a cap. Therefore, of the two adjoining axial direction spaces, one is an inflow passage of the exhaust gas, while the other is an outflow passage. The exhaust gas will definitely pass through the partition walls. The particulate in the exhaust gas is extremely small in comparison with the size of the fine holes of the partition walls, but they strike and are trapped on the exhaust upstream side surfaces of the partition walls and on the surfaces of the fine holes inside the partition walls. The particulate filter is made capable of removing trapped particulate by oxidation. To do so, the two surfaces of the partition walls and preferably also the surfaces of the fine holes inside the partition walls are made to carry an active oxygen release agent and precious metal catalyst explained below using alumina etc.

The active oxygen release agent is an agent that releases active oxygen to thereby accelerate oxidation of the particulate, preferably one that absorbs oxygen and holds oxygen if excess oxygen exists in the surroundings and releases the held oxygen in the form of active oxygen when the oxygen concentration in the surroundings drops.

The active oxygen release agent, for example, may be made a NOx storage catalyst. The NOx storage catalyst is at least one element selected from for example potassium K, sodium Na, lithium Li, cesium Cs, or another alkali metal, barium Ba, calcium Ca, or another alkali earth metal, and lanthanum La, yttrium Y, or another rare earth. This NOx storing catalyst stores NOx when the air-fuel ratio of the inflowing burned gas is lean, that is, when the oxygen concentration is high, and releases the stored NOx when the air-fuel ratio becomes the stoichiometric air-fuel ratio or rich, that is, when the oxygen concentration falls, as a NOx storing/releasing action. When absorbing and releasing the NOx, active oxygen is released. This activate oxygen can remove the particulate by oxidation without causing a bright flame. Usually platinum Pt is used as the precious metal catalyst functioning as an oxidation catalyst.

In this regard, when carried on the particulate filter 1 as an active oxygen release agent, as the NOx storage catalyst, an alkali metal or alkali earth metal having a higher ionization tendency than calcium Ca, for example, potassium K, is preferably used. By doing so, it becomes difficult for the calcium Ca in the exhaust gas to form the calcium sulfate $CaSO_4$ difficult to remove by oxidation and to remain as ash on the particulate filter.

The NOx storing/reducing catalyst device 2 is one having a monolith carrier or a pellet carrier using alumina etc. to carry the above-mentioned NOx storage catalyst and a precious metal catalyst such as platinum Pt. In this way, the NOx in the exhaust gas is stored by the NOx storing/reducing catalyst device 2. Even if NOx flowing out from the NOx storing/reducing catalyst device 2 exists, this NOx is stored by the particulate filter 1, so the amount of NOx released into the atmosphere can be sufficiently reduced.

In this regard, the NOx storage catalyst, if maintained at approximately 550 degrees C. or less, does not deteriorate by heat much at all. However, if made a temperature higher than 550 degrees C., heat deterioration causes its NOx storage ability to drop. For example, if held at 630 degrees C. for 10 hours, in particular the low temperature side NOx storage ability drops to approximately 80%.

The particulate filter 1, as mentioned above, is capable of automatically removing the trapped particulate by oxidation using the active oxygen released from the active oxygen release agent. However, if a large amount of particulate is released from the engine such as during acceleration operation, the amount of active oxygen is insufficient to remove all of that by oxidation, thereby sometimes causing deposition of the particulate on the particulate filter. If the deposited particulate becomes a set amount, the exhaust resistance of the particulate filter 1 will have a detrimental effect on the engine output, therefore, when the set amount of particulate is deposited on the particulate filter 1, it becomes necessary to forcefully burn off the deposited particulate. To do so, the particulate filter 1 must be raised to the combustion temperature of the particulate, that is, approximately 600 degrees C.

To judge if the set amount of particulate has been deposited on the particulate filter 1, for example, the differential pressure of the upstream side and the downstream side of the particulate filter 1 may be detected. If the differential pressure is a set value or more, it may be judged that the set amount or more of particulate is being deposited.

The temperature elevation control of the particulate filter 1 generally is performed by injecting additional fuel into the cylinder in the expansion stroke or exhaust stroke or feeding additional fuel to the engine exhaust system at the upstream side of the NOx storing/reducing catalyst device 2. This additional fuel of the temperature elevation control, when passing through the NOx storing/reducing catalyst device 2, burns using the oxygen in the exhaust gas by the oxidation catalyst carried on the NOx catalyst reduction catalyst device 2. The combustion heat raises the exhaust gas in temperature to 600 degrees C. or more. The exhaust gas is made to flow into the particulate filter 1 to raise the temperature of the particulate filter 1.

In this way, even if the NOx storage catalyst carried by the particulate filter 1 cannot be stopped from deteriorating by heat each time performing temperature elevation control of the particulate filter 1, the NOx storing/reducing catalyst device 2 is also simultaneously raised in temperature to 600 degrees C. or more causing the NOx storage catalyst carried in the NOx storing/reducing catalyst device 2 to deteriorate by heat.

To prevent this heat deterioration of the NOx storing/reducing catalyst device 2, in this embodiment, a controller 4 for performing temperature elevation control of the particulate filter 1, controls the amount of additional fuel necessary for raising the temperature of the particulate filter 1 to approximately 600 degrees C. to be fed to the engine exhaust system by the first fuel feed system RI arranged between the NOx storing/reducing catalyst device 2 and the particulate filter 1. The thus fed additional fuel burns using the oxygen in the exhaust gas from the oxidation catalyst carried in the particulate filter 1 thereby raising the temperature of the particulate filter 1. The air-fuel ratio of the exhaust gas into which the additional fuel is fed is preferably made leaner than the stoichiometric air-fuel ratio to make the additional fuel burn well. To do so, it is preferable for the controller 4 to perform temperature elevation control when the amount of exhaust gas is large such as during high speed/high load operation of the engine. In this temperature elevation control, the NOx storing/reducing catalyst device 2 arranged at the upstream side of the particulate filter 1 does not deteriorate due to heat because it is not raised in temperature at all.

When the particulate filter 1 does not carry an active oxygen release agent, the particulate in the exhaust gas just deposits on the particulate filter 1. When it is judged that, as mentioned above, the set amount of particulate is deposited on the particulate filter 1 or at scheduled intervals based on the vehicle running distance or vehicle running time, the controller 4 causes the temperature elevation control to be performed. When performing this temperature elevation control, if the particulate filter 1 carries an oxidation catalyst, in the same way as the above, the controller 4 may cause additional fuel to be supplied from the first fuel feed system RI. If the particulate filter 1 does not carry an oxidation catalyst, an oxidation catalyst device carrying an oxidation catalyst is arranged at the immediately upstream side of the particulate filter 1 and the controller 4 may cause the additional fuel to be fed from the first fuel feed system RI arranged between the NOx storing/reducing catalyst device 2 and the particulate filter 1 to the upstream side of the oxidation catalyst device.

In this regard, the NOx storage catalyst also ends up storing the SOx in the exhaust gas by a similar mechanism as with the NOx. The NOx storing/reducing catalyst device 2 carrying the NOx storage catalyst cannot store NOx without limit and has a maximum storable NOx amount. If SOx is stored, the maximum storable NOx amount will be reduced by that amount. Therefore, when the SOx stored amount reaches a set amount, recovery treatment to release the stored SOx is necessary. Because SOx is stored as stable sulfates, recovery treatment requires temperature elevation control raising the temperature of the NOx storing/reducing catalyst device to approximately 650 degrees C.

The controller 4 performs this temperature elevation control to be performed by injecting additional fuel into the cylinder in the expansion stroke or the exhaust stroke or feeding additional fuel to the engine exhaust system by a second fuel feed system FI arranged at the upstream side of the NOx storing/reducing catalyst device 2. The additional fuel of this temperature elevation control is burned at the NOx storing/reducing catalyst device 2 by the oxidation catalyst using the oxygen in the exhaust gas. Its combustion heat raises the temperature of the NOx storing/reducing catalyst device 2 to approximately 650 degrees C. Next, the additional fuel fed into the cylinder or the additional fuel from the second fuel feed system FI makes the air-fuel ratio of the exhaust gas flowing into the NOx storing/reducing catalyst device 2 the stoichiometric air-fuel ratio or the rich air-fuel ratio, whereby not only the NOx stored in the NOx storing/reducing catalyst device 2 but the SOx are released. The thus released NOx and SOx are purified by reduction by the HC and CO or other reducing substances in the exhaust gas.

Due to the temperature elevation control in this recovery treatment, the NOx storing/reducing catalyst device 2 will deteriorate due to heat, however the heat deterioration by the temperature elevation control of the particulate filter 1 is prevented, so the heat deterioration of the NOx storing/reducing catalyst device 2 may be suppressed compared to the past. However, heat deterioration in the recovery treatment of the NOx storing/reducing catalyst device 2 is not preferable, so in the present embodiment, at the upstream side of the NOx storing/reducing catalyst device 2, a S trap 3 storing the SOx in the exhaust gas is arranged. The S trap 3 has basically the same configuration as the NOx storing/reducing catalyst device 2 and preferably carries a large amount of NOx storage catalyst for storing the SOx.

If a S trap 3 is arranged at the upstream side of the NOx storing/reducing catalyst device 2 in this way, almost all of the SOx in the exhaust gas will be stored in the S trap 3, therefore will not be stored in the NOx storing/reducing catalyst device 2, so recovery treatment of the NOx storage catalyst device 2 becomes unnecessary. Due to this, heat deterioration of the NOx storage catalyst device 2 due to the temperature elevation control in the recovery treatment is prevented. The S trap 3 stores not only SOx but also NOx, but when SOx flows in, it is stored in place of the NOx so only SOx will be stored. If recovery treatment for releasing SOx from the S trap 3 is not performed and SOx is stored up to the maximum storable SOx amount, the S trap 3 is replaced with a new one.

In this way, the NOx storing/reducing catalyst device 2 stores only NOx. Before the NOx stored amount reaches the maximum storable NOx amount, regeneration treatment for making it release the stored NOx is performed. For example, if mapping the per unit time NOx exhaust amount for each engine operation state in advance and cumulatively adding the NOx exhaust amount at each engine operation state, the cumulative value can be made the NOx stored amount of the NOx storing/reducing catalyst device 2. When this NOx stored amount reaches a set value, it can be judged that it is the time for regeneration of the NOx storing/reducing catalyst device 2. It is also possible not to judge the regeneration period in such a way, but to perform the regeneration treatment using each set vehicle running time or each set vehicle running distance as the regeneration timing.

In the regeneration treatment, the additional fuel fed to the cylinder or the additional fuel from the second fuel feed system FI makes the air-fuel ratio of the exhaust gas flowing into the NOx storing/reducing catalyst device 2 the stoichiometric air-fuel value or the rich air-fuel value. At this time, at the S trap 3 and the NOx storing/reducing catalyst device 2, the additional fuel is burned by the oxidation catalyst using the oxygen in the exhaust gas thereby lowering the oxygen concentration in the exhaust gas. If the additional fuel necessary to make the air-fuel ratio of the exhaust gas the stoichiometric air-fuel value or the rich air-fuel value becomes a large amount, the burning of the additional fuel will cause the NOx storing/reducing catalyst device 2 to rise in temperature to an extent where it deteriorates due to heat, so when performing the regeneration treatment, it is preferable that the exhaust gas amount be low such as during low speed/low load operation.

If the oxygen concentration in the exhaust gas falls, the NOx stored in the S trap 3 and the NOx storing/reducing catalyst device 2 will be released, and the released NOx will be purified by reduction by the reducing substances in the exhaust gas thereby completing the regeneration treatment. In order to perform regeneration treatment, the second fuel feed system FI for feeding additional fuel to the engine exhaust system at the upstream side of the NOx storing/reducing catalyst device 2 is arranged at the upstream side of the S trap 3, however, regeneration treatment of the S trap 3 is not particularly necessary, so it may be arranged at the downstream side of the S trap 3 as well.

In such regeneration treatment of the NOx storing/reducing catalyst device 2, the exhaust gas temperature rises due to the burning of the additional fuel, so the particulate filter 1 is raised in temperature. Due to this, if performing the regeneration treatment of the NOx storing/reducing catalyst device 2 together with the temperature elevation control of the particulate filter 1 or if performing the temperature elevation control of the particulate filter 1 together with the regeneration treatment of the NOx storing/reducing catalyst device 2, the energy necessary for temperature elevation control of the particulate filter 1 may be conserved.

Figure 2:
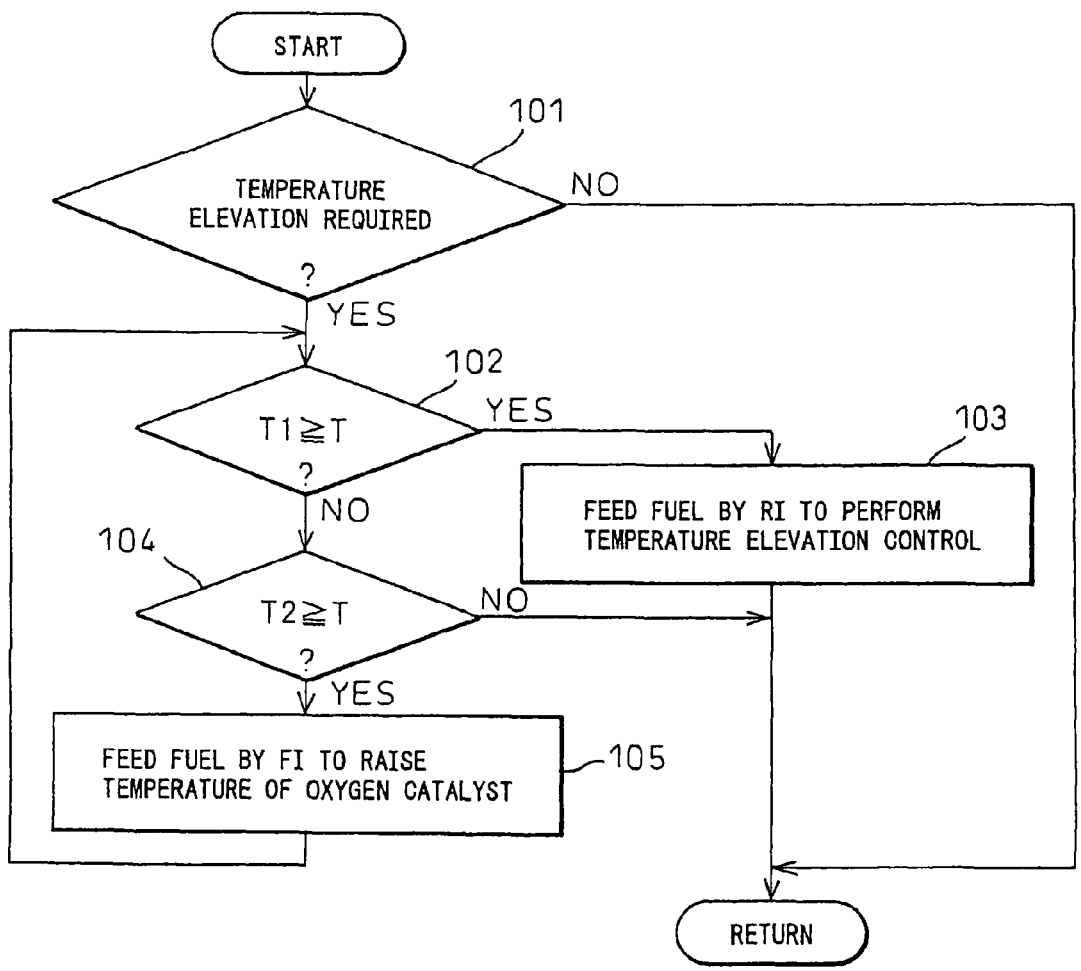
FIG. 2 is a flow chart for temperature elevation control of a particulate filter.

FIG. 2 is a flow chart for operation of the controller 4 performing the temperature elevation control of the particulate filter 1. First, at step 101, it is judged by the controller 4 if a set amount of particulate has deposited on the particulate filter 1 and temperature elevation control for burning the deposited particulate is demanded. When this judgment is negative, the routine ends as it is, but when it is affirmative, at step 102, it is judged by the controller 4 if the temperature T1 of the oxidation catalyst carried on the particulate filter 1 (or the oxidation catalyst of the oxidation catalyst device arranged at the immediately upstream side of the particulate filter 1) is the activation temperature T or more. For example, the exhaust gas temperature flowing into the particulate filter 1 (or the oxidation catalyst device) may be estimated or measured and this exhaust gas temperature can be used as the temperature T1 of the oxidation catalyst.

When the judgment of step 102 is affirmative, at step 103, as mentioned above, the controller 4 causes additional fuel to be fed to the engine exhaust system by the first fuel feed system RI arranged between the particulate filter 1 and the NOx storing/reducing catalyst device 2, and temperature elevation control of the particulate filter 1 is performed. However, when the temperature T1 of the oxidation catalyst of the particulate filter 1 is less than the activation temperature, even if additional fuel is fed, the additional fuel cannot be burned.

Due to this, when the judgment of step 102 is negative, at step 104, it is judged if the temperature T2 of the oxidation catalyst carried on the NOx storing/reducing catalyst'device 2 is the activation temperature T or more. The NOx storing/reducing catalyst device 2 is positioned closer to the engine body than the particulate filter 1, so is higher in temperature than the particulate filter 1. However, when the judgment of step 104 is negative, temperature elevation control of the particulate filter 1 cannot be performed and the routine ends.

On the other hand, when the judgment of step 104 is affirmative and the temperature T2 of the oxidation catalyst of the NOx storing/reducing catalyst device 2 is the activation temperature T or more, at step 105, the controller 4 causes additional fuel to be fed into the cylinder or additional fuel to be fed to the engine exhaust system by the second fuel feed system FI arranged at the upstream side of the NOx storing/reducing catalyst device 2 and the additional fuel is burned by the oxidation catalyst of the NOx storing/reducing catalyst device 2.

The exhaust gas heated by this fuel combustion is made to flow into the particulate filter 1 and the temperature T1 of the oxidation catalyst of the particulate filter 1 is raised to the activation temperature T. The amount of the additional fuel burned at the NOx storing/reducing catalyst device 2 is controlled by controller 4 to be made smaller than the amount of fuel fed by the first fuel feed system RI at the temperature elevation control of the particulate filter 1 because it is sufficient to raise the particulate filter 1 to a temperature up to the activation temperature T of the oxidation catalyst. Due to this, that combustion heat will not cause the NOx storing/reducing catalyst device 2 to be raised to a heat deterioration temperature (approximately 550 degrees C. or more).

Thus, if the temperature T1 of the oxidation catalyst of the particulate filter 1 is raised to the activation temperature T or more, the judgment of step 102 is affirmative, the controller 4 causes additional fuel to be fed to the engine exhaust system by the first fuel feed system RI arranged between the particulate filter 1 and the NOx storing/reducing catalyst device 2, and temperature elevation control of the particulate filter 1 is performed. The additional fuel amount fed by the first fuel feed system RI is controlled by the controller 4 to be the minimum amount necessary for raising the particulate filter 1 to a set temperature and is made lower the higher the temperature of the exhaust gas flowing into the particulate filter 1. In this way, it is possible to perform the temperature elevation control of the particulate filter 1 more reliably.

FIG. 3 is a graph showing the relationship of the temperature TF of the particulate filter 1 and the amount of particulate G removable per unit time when making the particulate filter 1 carry an active oxygen release agent.

The platinum and active oxygen release agent become activated more the higher the temperature of the particulate filter 1, so the amount of active oxygen released from the active oxygen release agent per unit time increases the higher the temperature TF of the particulate filter. Further, only naturally, the higher the temperature of the particulate itself, the easier removal by oxidation is. Accordingly, the amount of particulate G removable per unit time enabling removal of particulate by oxidation per unit time without emitting a luminous flame on the particulate filter 1 increases the higher the temperature TF of the particulate filter.

At FIG. 3, per unit time is 1 second, however, any amount of time such as 1 minute or 10 minutes may be used. Whatever the case, the amount of particulate G removable per unit time enabling removal of particulate by oxidation per unit time without emitting a luminous flame on the particulate filter 1 increases the higher the temperature of the particulate filter 1.

In this embodiment, the temperature TF of the particulate filter 1 is controlled so that the present particulate amount M exhausted from the engine per unit time is exceeded by the amount of particulate G removable per unit time.

That is, the temperature of the particulate filter 1 is estimated or measured and when the temperature of this particulate filter 1 is low and the present particulate amount M exhausted per unit time exceeds the amount of particulate G removable per unit time, the first fuel feed system RI feeds additional fuel to make the oxidation catalyst of the particulate filter 1 burns additional fuel to raise the particulate filter 1 in temperature and make the present particulate amount M exhausted from the engine per unit time be exceeded by the amount of particulate G removable per unit time. During this, it is preferable for the first fuel feed system RI to feed the smallest amount of fuel necessary to conserve fuel.

Due to this, the particulate trapped on the particulate filter 1 is removed by oxidation in a short period of time (several minutes at the longest) and particulate will not deposit much at all on the particulate filter 1. Therefore, the instances of temperature elevation control of the particulate filter 1 can be reduced sufficiently.

In the aforementioned embodiment, the case where the NOx storing/reducing catalyst device 2 is arranged in series at the upstream side of the particulate filter 1 was explained. However, this does not limit the present invention. As long as a second exhaust purification device such as an NOx storing/reducing catalyst device that deteriorates by heat is arranged in series at the upstream side of a first exhaust purification device such as a particulate filter requiring temperature elevation control to a set temperature (for example, 600 degrees C.) or more, any combination of exhaust purification devices of the first exhaust purification device and the second exhaust purification device may be considered. In particular, it is preferable that the second exhaust purification device not require temperature elevation control to an extent where it itself deteriorates due to the heat. For example, the second exhaust purification device may be a three-way catalyst. Further, the first exhaust purification device may be made a NOx storing/reducing catalyst requiring recovery treatment.

Further, the first exhaust purification device and the second exhaust purification device may both be arranged under the floor of the vehicle. However, it is also possible for only the second exhaust purification device of the upstream side to be arranged in the engine compartment.

The invention claimed is:

1. An exhaust purification system for an internal combustion engine, comprising:
 a first exhaust purification device requiring temperature elevation control to at least a set temperature;
 a second exhaust purification device arranged at an upstream side of the first exhaust purification device
 a first fuel feed system that feeds fuel at a position between the first exhaust purification device and the second exhaust purification device,
 an oxidation catalyst carried on at least one of the first exhaust purification device or an oxidation catalyst device positioned at an immediately upstream side of the first exhaust purification device; and
 a controller including a temperature elevation control routine which, when executed, performs the steps of:

elevating the temperature in the first exhaust purification device to the at least the set temperature by feeding fuel by the first fuel feed system to be burned by the oxidation catalyst carried on the at least one of the first exhaust purification device or the oxidation catalyst device to perform the temperature elevation control in the first exhaust purification device, inhibiting the second exhaust purification device from being raised in temperature to the at least the set temperature, and in a condition that the temperature elevation control is performed in the first exhaust purification device and the oxidation catalyst is at less than the activation temperature, feeding a smaller amount of fuel from a second fuel feed system at an upstream side of the second exhaust purification device than an amount of fuel fed by the first fuel feed system, causing the smaller amount of fuel to burn by an oxidation function of the second exhaust purification device to make the temperature of the exhaust gas rise, and feeding the fuel from the first fuel feed system only after heated exhaust gas raises the oxidation catalyst in temperature to at least the activation temperature.

2. An exhaust purification system for an internal combustion engine as set forth in claim 1, wherein the second exhaust purification device is a NOx storing/reducing catalyst device, in a condition that the air-fuel ratio of the exhaust gas flowing into the NOx storing/reducing catalyst device is made a stoichiometric air-fuel ratio or a rich air-fuel ratio to make the NOx storing/reducing catalyst device release and purify by reduction the stored NOx, the exhaust purification system performs the temperature elevation control in the first exhaust purification device.

3. An exhaust purification system for an internal combustion engine, comprising:
a first exhaust purification device requiring temperature elevation control to at least a set temperature;
a second exhaust purification device arranged at an upstream side of the first exhaust purification device;
a fuel feed system that feeds fuel at a position between the first exhaust purification device and the second exhaust purification device;
an oxidation catalyst carried on at least one of the first exhaust purification device or an oxidation catalyst device positioned at an immediately upstream side of the first exhaust purification device; and
a controller including a temperature elevation control routine which, when executed, performs the steps of:
elevating the temperature in the first exhaust purification device to the at least the set temperature by feeding fuel by the fuel feed system to be burned by the oxidation catalyst carried on the at least one of the first exhaust purification device or the oxidation catalyst device to perform the temperature elevation control in the first exhaust purification device, and
inhibiting the second exhaust purification device from being raised in temperature to the at least the set temperature,
wherein the first exhaust purification device is a particulate filter carrying an active oxygen release agent, and
the controller makes the fuel feed system feed fuel separately from the temperature elevation control so that as an amount of particulate flowing into the particulate filter per unit time increases, a temperature of the particulate filter is made to increase.

4. An exhaust purification system for an internal combustion engine as set forth in claim 1, wherein the second exhaust purification device is a NOx storing/reducing catalyst device and a S trap storing SOx in the exhaust gas is arranged at the upstream side of the NOx storing/reducing catalyst device.

5. A method for exhaust purification in an internal combustion engine, comprising:
feeding fuel to a first exhaust purification device that requires temperature elevation control to at least a set temperature via a first fuel feed system positioned between the first exhaust purification device and a second exhaust purification device arranged at an upstream side of the first exhaust purification device, the second exhaust purification being positioned upstream of the fuel feed system to inhibit the second exhaust purification device from being raised in temperature to the at least the set temperature;
burning the fuel fed by the first fuel feed system by an oxidation catalyst carried on at least one of the first exhaust purification device or an oxidation catalyst device positioned at an immediately upstream side of the first exhaust purification device to perform the temperature elevation control in the first exhaust purification device; and
in a condition that the temperature elevation control is performed in the first exhaust purification device and the oxidation catalyst is at less than an activation temperature,
feeding a smaller amount of fuel from a second fuel feed system on an upstream side of the second exhaust purification device than an amount of fuel fed by the first fuel feed system;
causing the smaller amount of fuel to burn by an oxidation function of the second exhaust purification device to make the temperature of the exhaust gas rise; and
feeding fuel from the first fuel feed system only after heated exhaust gas raises the oxidation catalyst in temperature to at least the activation temperature.

6. A method for exhaust purification in an internal combustion engine, comprising:
feeding fuel to a first exhaust purification device that requires temperature elevation control to at least a set temperature via a fuel feed system positioned between the first exhaust purification device and a second exhaust purification device arranged at an upstream side of the first exhaust purification device, the second exhaust purification being upstream of the fuel feed system to inhibit the second exhaust purification device from being raised in temperature to the at least the set temperature, and
burning the fuel fed by the fuel feed system by an oxidation catalyst carried on at least one of the first exhaust purification device or an oxidation catalyst device positioned at an immediately upstream side of the first exhaust purification device to perform the temperature elevation control in the first exhaust purification device,
wherein the first exhaust purification device is a particulate filter carrying an active oxygen release agent, and the fuel is fed from the fuel feed system separately from the temperature elevation control so that as an amount of particulate flowing into the particulate filter per unit time increases, a temperature of the particulate filter is made to increase.

* * * * *